United States Patent [19]

Gamboa

[11] 4,412,157
[45] Oct. 25, 1983

[54] PROTECTION CIRCUIT FOR A HORIZONTAL SCANNING CIRCUIT AND CRT

[75] Inventor: Paul Gamboa, St. Charles, Ill.

[73] Assignee: Motorola, Inc., Schaumburg, Ill.

[21] Appl. No.: 344,918

[22] Filed: Feb. 2, 1982

[51] Int. Cl.³ .................... H01J 29/70; H01J 29/72
[52] U.S. Cl. .................................. 315/387; 315/408; 358/220
[58] Field of Search ............... 315/387, 389, 399, 408, 315/409, 410; 358/220

[56] References Cited

U.S. PATENT DOCUMENTS

| | | | |
|---|---|---|---|
| Re. 27,492 | 9/1972 | Wheatley, Jr. | 178/69.5 TV |
| Re. 27,793 | 10/1973 | Burrus | 178/7.5 R |
| 3,641,361 | 2/1972 | Limbert et al. | 307/202 |
| 3,774,069 | 11/1973 | Yasumatsuya | 315/408 |
| 4,056,758 | 11/1977 | Schaas | 315/381 |

*Primary Examiner*—Theodore M. Blum
*Attorney, Agent, or Firm*—Margaret Marsh Parker; James W. Gillman; James S. Pristelski

[57] ABSTRACT

One circuit, providing a feedback signal from the horizontal output transistor to the horizontal drive circuit, prevents damage to the output transistor in the event of a disruption or noise in the input signal, and also prevents "spot burn" of the CRT screen if the input signal should fail while there is still a charge on the CRT.

4 Claims, 1 Drawing Figure

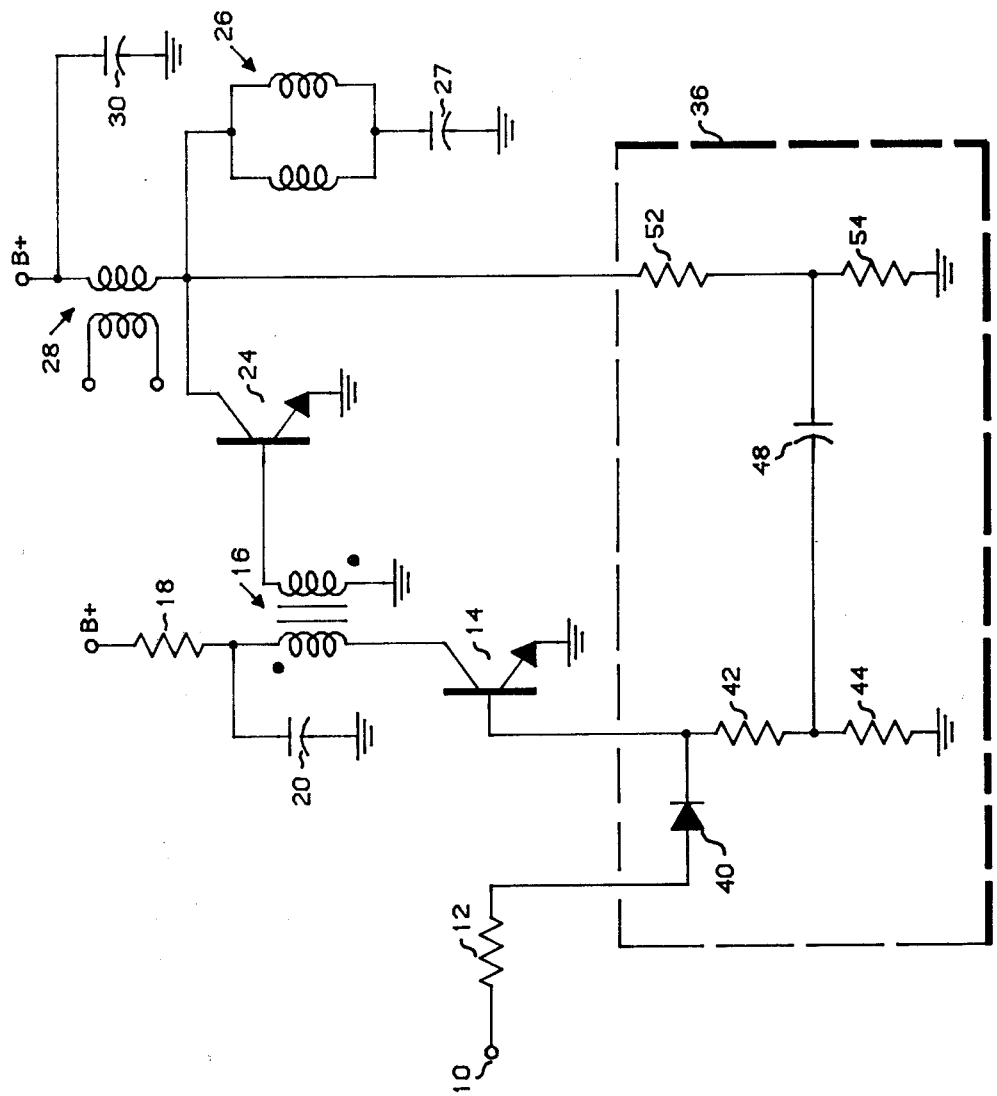

PROTECTION CIRCUIT FOR A HORIZONTAL SCANNING CIRCUIT AND CRT

BACKGROUND OF THE INVENTION

This invention relates to the field of cathode ray tube circuitry and, more particularly, to means for preventing damage to the output transistor in the horizontal scanning circuit of a CRT device, or to the CRT screen.

In the field of CRT devices it is well known that the horizontal output transistor which supplies the horizontal deflection current to the yoke is subject to damage under a number of circuit conditions. For example, if a disrupted drive signal were to be applied to the driver transistor in the circuit, the output transistor would be caused to conduct during a portion of the flyback time. In that event, the collector current of the output transistor could exceed safe limits. Naturally, if the CRT device uses an internal oscillator which is merely synced by the incoming horizontal sync pulses, this problem would rarely, if ever, occur. Such devices depend on the free-running frequency of the oscillator for such protection. However, in directly driven systems, where each horizontal deflection is dependent solely on an incoming pulse, the situation is somewhat different. This is typically the situation in data display monitors where the "direct drive" signals come from the logic circuitry which develops the timing sequence which is necessary in order to generate the characters of the data display. During initialization or due to a received "spike" or to an interruption in the supply voltage, the logic circuitry may "miscount" or change frequency. Also, in a direct drive horizontal deflection system, if the B+ and drive signal should be terminated at the same time, the total residual charge could damage the CRT screen (known as "spot burn"). The flyback voltage is usually rectified to supply a high DC voltage to the CRT screen. If this voltage is allowed to remain on the CRT when B+ and the drive signal are removed, a high intensity electron beam will be produced, aimed at the center of the screen. This problem is often prevented by including a bleeder resistor to discharge the high DC voltage before the screen can be damaged. This solution has two disadvantages; namely, the relatively high cost of such a resistor, and the load added to the circuit by the resistor.

Another known solution, known as a "spot kill" circuit, uses the turn-off of B+ and drive to turn on a transistor which will put a bias on the grid of the CRT. This grid voltage, applied at the same time that the above-mentioned high intensity beam is produced, causes a harmless "flash" over the entire screen instead of a burn at the center of the screen. The flash discharges the stored high voltage. The simplest known "spot kill" circuit includes at least one transistor and a diode, plus resistors and capacitors and is, therefore, a relatively expensive solution also.

SUMMARY OF THE INVENTION

It is, therefore, an object of the present invention to provide a means for preventing damage to the horizontal output transistor of a CRT device.

It is also an object to provide additional protection for the fluorescent screen of the CRT device.

These and other objects which will become apparent are obtained by adding a protective circuit to the usual horizontal scanning circuit of the device. This protective circuit provides a feedback signal which prevents conduction in the horizontal output transistor during the flyback period by keeping the driver transistor "on". In the event that failure of B+ and signal should occur simultaneously, self-oscillation of the deflection circuit will prevent "spot burn".

BRIEF DESCRIPTION OF THE DRAWING

The single drawing FIGURE is a schematic diagram including the protective circuit of the present invention.

DETAILED DESCRIPTION OF PREFERRED EMBODIMENT

The schematic diagram of the drawing figure shows one possible implementation of the invention, but it will be apparent to those skilled in the art that other horizontal scanning circuits could benefit by the addition of the inventive circuit.

First, the operation of a typical horizontal scanning circuit will be described without the benefit of the protective circuit. As is known, a horizontal drive signal, consisting of a pulse for each horizontal line, is coupled to an input terminal 10. This drive signal may have been derived from a composite video signal or may originate in external logic circuitry. These pulses are coupled through a resistor 12 to a driver transistor 14. The driver transistor is in series with the primary of a driver transformer 16 and a resistor 18 coupled to B+. A capacitor 20 is coupled across the driver transformer primary. The secondary of the driver transformer 16 is coupled to a horizontal output transistor 24. The collector of the transistor 24 is coupled to a yoke coil 26 and a capacitor 27, and to B+ through the primary of a flyback transformer 28. A capacitor 30 is coupled across the flyback transformer primary.

If the drive signal at terminal 10 were to be disrupted during the flyback pulse (retrace), the driver transistor 14 would normally cause the horizontal output transistor 24 to conduct. Since this would be during the flyback time, the voltage on the collector of the transistor 24 could be, for example, 150 volts; thus the collector current could be far in excess of a safe level. In addition, if the B+ and the drive signal at terminal 10 were to fail at the same time, even for a very brief period, the residual charge in the capacitors 20, 27, 30, the coil 26 and, primarily, the CRT device itself (not shown) can cause a burn on the screen of the CRT.

With the addition of the circuit 36 of the invention (enclosed in the dashed line), the above-mentioned possibilities for damage are essentially eliminated. The circuit 36 includes a diode 40 coupled between the resistor 12 and the driver transistor 14 and coupled to a first divider resistor chain 42, 44. A tap on the first resistor chain is coupled through a capacitor 48 to a tap on a second resistor chain consisting of resistors 52, 54. The second resistor chain is coupled to the collector of the horizontal output transistor 24. It will be seen that the voltage applied to the second resistor chain 52, 54 is 180° out of phase with the voltage from the driver transformer 16, and as long as the collector of transistor 24 has a high voltage on it, the driver transistor 14 will conduct, preventing transistor 24 from conducting. Thus, a feedback signal is provided which will keep the driver transistor 14 "on" during the flyback period and, therefore, the transistor 24 cannot conduct at that time.

"Fly-back" is, of course, only a fraction of the total line period; e.g. one-fifth, and it is only during that fraction of the period that the transistor 24 needs protection. The component values of the circuit 36 are chosen for any particular horizontal circuit so that the base drive requirements of the driver transistor 14 are met and the transistor 14 is turned on as required.

In the event of loss of drive signal, self-oscillation will occur as long as B+ is present or is discharging, thus moving the spot on the center of the screen so that burning of the screen is prevented. The components of the circuit 36 provide the necessary feedback pulses, and the frequency of the self-oscillation is determined primarily by the resonant circuit including the flyback transformer, yoke (26) and capacitor (27). The diode 40 serves mainly to isolate the feedback path from the terminal 10, since the impedance of the drive source may be very low. All of the feedback signal is therefore applied to the driver transistor. If the circuit 36 were to be used in a deflection circuit not utilizing a driver transformer (providing the out-of-phase signal), some other means would be needed to provide the inversion.

Thus there has been provided, in accordance with the invention, a means of protecting both the horizontal output transistor and the CRT screen and at very low cost. A feedback loop requiring no expensive components couples the horizontal yoke coil voltage back to the driver transistor, keeping the driver transistor "on" and the horizontal output transistor "off" during the flyback time. The same feedback loop also allows the deflection circuit to self-oscillate in the event of failure of horizontal drive signal. The circuit thus protects both the horizontal output transistor and the CRT screen. Other variations and modifications are possible and it is intended to cover all which fall within the spirit and scope of the appended claims.

What is claimed is:

1. A horizontal scanning circuit having the capability of self-oscillation at a first predetermined frequency for a CRT device comprising:
    input means for providing horizontal deflection drive signals at a second predetermined frequency, the second frequency being higher than the first predetermined frequency;
    yoke means for providing horizontal deflection of the electron beam in the CRT;
    horizontal output transistor means coupled to supply signals to the yoke means;
    driver means coupled to the input means and to the horizontal output transistor means for preventing conduction in the transistor means and preventing oscillation in the circuit when the driver means is conducting; and
    feedback means for coupling the yoke supply signals to control the driver means for allowing self-oscillation in the circuit only while energy is stored in the circuit elements and the drive signals are interrupted.

2. A horizontal scanning circuit according to claim 1 and wherein the driver means includes a driver transistor and a driver transformer, and the yoke supply signals control conduction in the driver transistor.

3. A horizontal scanning circuit according to claim 1 and further including rectifying means coupled to isolate the feedback means from the input means.

4. A horizontal scanning circuit according to claim 1 and further including a flyback transformer coupled to the output transistor means and a capacitor coupled to the yoke means, and wherein a resonant circuit including the yoke means, the flyback transformer and the capacitor can oscillate in the absence of drive signals as long as power is available to the scanning circuit.

* * * * *